United States Patent
Polk, Jr.

(10) Patent No.: US 8,813,741 B2
(45) Date of Patent: Aug. 26, 2014

(54) STATIONARY PARABOLIC SOLAR POWER SYSTEM AND RELATED METHODS FOR COLLECTING SOLAR ENERGY

(75) Inventor: Dale E. Polk, Jr., Titusville, FL (US)

(73) Assignee: D & D Manufacturing FL (US)

( * ) Notice: Subject to any disclaimer, the term of this patent is extended or adjusted under 35 U.S.C. 154(b) by 870 days.

(21) Appl. No.: 12/725,959

(22) Filed: Mar. 17, 2010

(65) Prior Publication Data
US 2010/0269816 A1    Oct. 28, 2010

Related U.S. Application Data

(60) Provisional application No. 61/160,775, filed on Mar. 17, 2009.

(51) Int. Cl.
*F24J 2/38* (2014.01)

(52) U.S. Cl.
USPC .......... 126/600; 126/663; 126/714; 126/684; 126/690

(58) Field of Classification Search
USPC ............... 126/600, 663, 714, 684, 686, 690; 136/246, 248
See application file for complete search history.

(56) References Cited

U.S. PATENT DOCUMENTS

| | | | |
|---|---|---|---|
| 1,345,758 A | 7/1920 | Folsom | |
| 2,961,802 A * | 11/1960 | Mongan et al. | 52/81.4 |
| 4,018,215 A | 4/1977 | Pei | 126/271 |
| 4,120,286 A | 10/1978 | Farber | 126/271 |
| 4,151,829 A | 5/1979 | Wilson | |
| 4,220,136 A * | 9/1980 | Penney | 126/600 |
| 4,313,424 A | 2/1982 | Schreyer et al. | 126/438 |
| 4,326,502 A * | 4/1982 | Radenkovic | 126/685 |
| 4,327,705 A | 5/1982 | Steutermann | |
| 4,333,447 A * | 6/1982 | Lemrow et al. | 126/657 |
| 4,515,148 A * | 5/1985 | Boy-Marcotte et al. | 126/570 |
| 4,587,951 A * | 5/1986 | Townsend et al. | 126/605 |
| 4,815,444 A * | 3/1989 | Holland | 126/651 |
| 5,153,780 A * | 10/1992 | Jorgensen et al. | 359/853 |
| 6,886,339 B2 | 5/2005 | Carroll et al. | 60/641.8 |
| 7,240,675 B2 | 7/2007 | Eickhoff | 126/652 |
| 2005/0126560 A1* | 6/2005 | Litwin | 126/683 |
| 2010/0037953 A1 | 2/2010 | Xie | 135/259 |

* cited by examiner

*Primary Examiner* — Avinash Savani

(57) ABSTRACT

A solar energy collector system includes a base, and a parabolic trough collector carried by the base for reflecting sunlight to a longitudinal focal line. The parabolic trough collector includes a center section horizontally positioned with respect to ground, and opposing end sections adjacent the center section. Each end section is angled towards the ground. A conduit is positioned along the longitudinal focal line to receive the reflected sunlight. The conduit circulates a heat transfer liquid therethrough to be heated by the reflected sunlight.

34 Claims, 9 Drawing Sheets

FIG. 9

STATIONARY PARABOLIC SOLAR POWER SYSTEM AND RELATED METHODS FOR COLLECTING SOLAR ENERGY

RELATED APPLICATIONS

This application claims the benefit of U.S. Provisional Application Ser. No. 61/160,775 filed Mar. 17, 2009, the entire contents of which are incorporated herein by reference.

FIELD OF THE INVENTION

The present invention relates to the field of solar energy collector systems, and more particularly, to parabolic trough solar collectors.

BACKGROUND OF THE INVENTION

There are a variety of solar energy collector systems available for converting solar energy into other forms of energy that can be more readily used or stored. These systems typically employ solar collectors that collect solar radiation and convert it into a more useable form of energy, such as heat.

Solar collectors of the flat plate type have been used in low energy applications such as heating water, generating low pressure steam, supplementing air conditioning and heating systems, and the like. Flat plate collectors do not focus the sun's radiation and have limited applicability.

Another type of collector is generically called a concentrating collector. These collectors focus or concentrate the sun's radiation energy in a particular area. Concentrating collectors can be designed to operate at high temperatures with reasonable flow rates, thus substantially increasing the versatility of systems incorporating these collectors over systems employing flat plate collectors.

One type of concentrating collector is the parabolic trough collector. This type of collector uses an elongated reflective trough having a parabolic cross-section to concentrate the sun's radiation along a longitudinal focal line extending through the focal points of the parabolic elements of the trough. A conduit can be positioned along this longitudinal focal line and a heat transfer liquid can be circulated through the conduit, where it will be heated by the sun's energy. Satisfactory flow rates at high temperatures can be obtained from these collectors.

With the assistance of a tracking system, parabolic trough collectors can become very efficient as they follow the movement of the sun. U.S. Pat. No. 6,886,339 discloses a solar power collection system comprising parabolic trough collectors that operate with a positioning system that provides movement about a single axis of rotation. A controller drives a motor to pivot the parabolic trough collectors about the longitudinal focal line. However, because of the need for such a tracking system, parabolic trough collectors have typically relied on complicated and expensive rotating assemblies to position the parabolic trough collectors directly toward the sun as the sun travels from east to west during the day. Consequently, there is a need for a solar energy collector system that does not rely on complicated and expensive rotating assemblies to position the parabolic trough collectors directly toward the sun.

Another problem associated with solar energy collector systems is with respect to the conduit positioned along the focal line. A small focal point is desired to maximize the efficiency of the collectors. However, this typically requires regular adjustments of the reflecting surfaces. A tradeoff is to use a larger focal point to collect more energy, but this reduces efficiency since a larger volume of liquid is to be heated. Consequently, there is also a need to improve the efficiency of the conduit for solar energy collector systems.

SUMMARY OF THE INVENTION

In view of the foregoing background, it is therefore an object of the present invention to provide a straightforward solar energy collector system that is also efficient.

This and other objects, advantages and features in accordance with the present invention are provided by a solar energy collector system comprising at least one base, and at least one parabolic trough collector carried by the at least one base for reflecting sunlight to a longitudinal focal line. The parabolic trough collector may comprise a center section horizontally positioned with respect to ground, and opposing end sections adjacent the center section. Each end section may be angled towards the ground.

The parabolic trough collector and the base may remain stationary when reflecting sunlight to the longitudinal focal line. An advantage of a stationary solar energy collector system is that the parabolic trough collectors do not need to be rotated as the sun travels from east to west during the day since a section thereof is always pointed toward the sun.

The solar energy collector system may further comprise at least one tilting device coupled to each base for adjusting a latitudinal angle of the parabolic trough collector with respect to the ground. This advantageously compensates for the seasonal rotation of the sun.

The solar energy collector system may further comprise a conduit positioned along the longitudinal focal line to receive the reflected sunlight. The conduit is to circulate a heat transfer liquid therethrough to be heated by the reflected sunlight.

The conduit may comprise a center section horizontally positioned with respect to the ground, and opposing end sections adjacent the center section. Each end section may be angled towards the ground. In other words, a profile of the conduit corresponds to a profile of the parabolic trough collector.

The conduit may comprise an inner tube and a spaced apart outer tube, with the heat transfer liquid to be circulated between the inner and outer tubes. By circulating the heat transfer liquid between the inner and outer tubes, a larger focal point is advantageously obtained with a reduced volume of the heat transfer liquid.

The inner and outer tubes may be U-shaped. The conduit may further comprise a conduit cover covering exposed upper portions of the U-shaped inner and outer tubes to seal off the heat transfer liquid. The conduit cover may also cover the inner tube between the exposed portions of the U-shaped inner tube. The conduit cover may comprise a clear material, and the inner and outer tubes may each comprise an opaque coating.

The parabolic trough collector and the base may be formed as a monolithic unit. The parabolic trough collector and the base may comprise a thermoplastic material and/or a thermosetting material. This significantly reduces setup, shipping and maintenance costs typically associated with a parabolic trough solar collector panel that is rotated to track the sun.

The solar energy collector system may comprise a plurality of bases adjacent one another. Likewise, there may be a plurality of parabolic trough collectors adjacent one another. Each base is carried by a respective parabolic trough collector having a conduit positioned along the longitudinal focal line. The conduit may further comprise a respective interconnecting section for connecting adjacent conduits together. In addition, the adjacent parabolic trough collectors may be coupled together.

Another aspect is directed to a solar energy collector system comprising at least one base, at least one collector carried by the at least one base for reflecting sunlight to a longitudinal focal line, and a conduit positioned along the longitudinal focal line to receive the reflected sunlight. The conduit may comprise an inner tube, and an outer tube spaced apart from the inner tube. A heat transfer liquid is to be circulated between the inner and outer tubes. An advantage of the conduit associated with a basic collector is that a larger focal point is advantageously obtained with a reduced volume of the heat transfer liquid since the heat transfer liquid circulates between the inner and outer tubes.

Yet another aspect is directed to a method for collecting solar energy using a solar energy collector system as described above. The method may comprise providing at least one base, and at least one parabolic trough collector carried by the at least one base. The at least one parabolic trough collector comprises a center section horizontally positioned with respect to ground, and opposing end sections adjacent the center section, with each end section angled towards the ground. The method may further comprise using the at least one parabolic trough collector for reflecting sunlight to a longitudinal focal line. A conduit is positioned along the longitudinal focal line to receive the reflected sunlight, and a heat transfer liquid is circulated through the conduit to be heated by the reflected sunlight.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
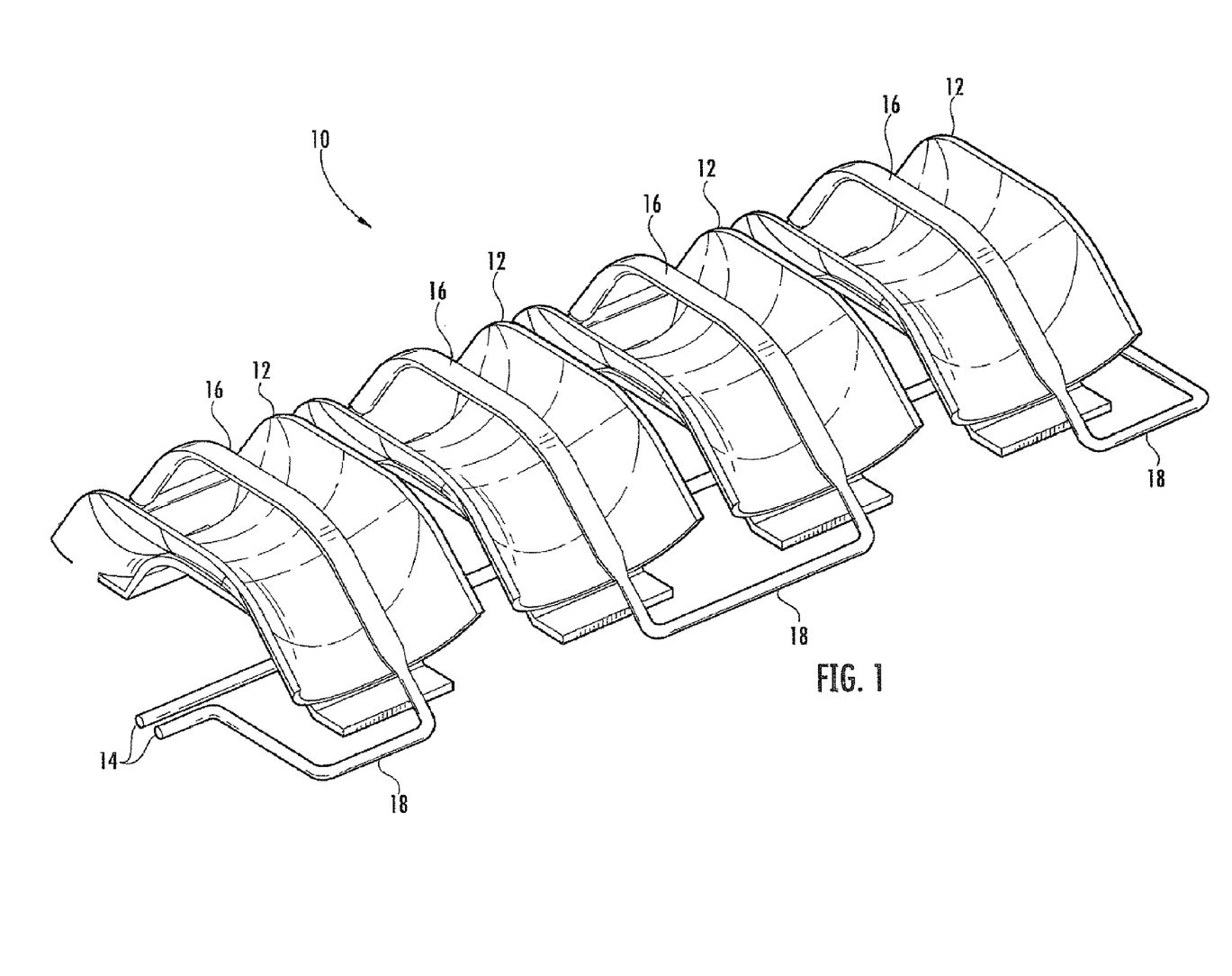
FIG. 1 is a perspective view of a stationary parabolic solar power system in accordance with the present invention.
Figure 2:
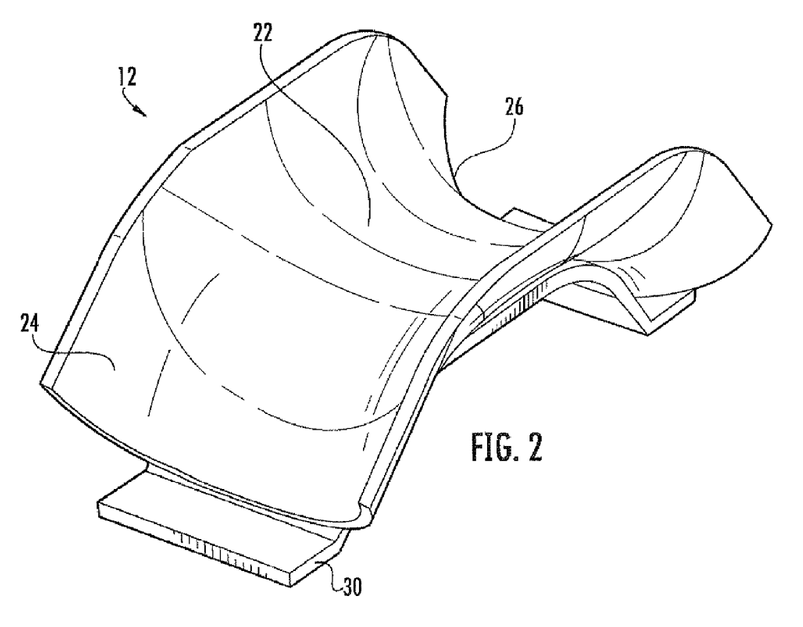
FIG. 2 is a perspective side view of a single parabolic trough collector in accordance with the present invention.
Figure 3:
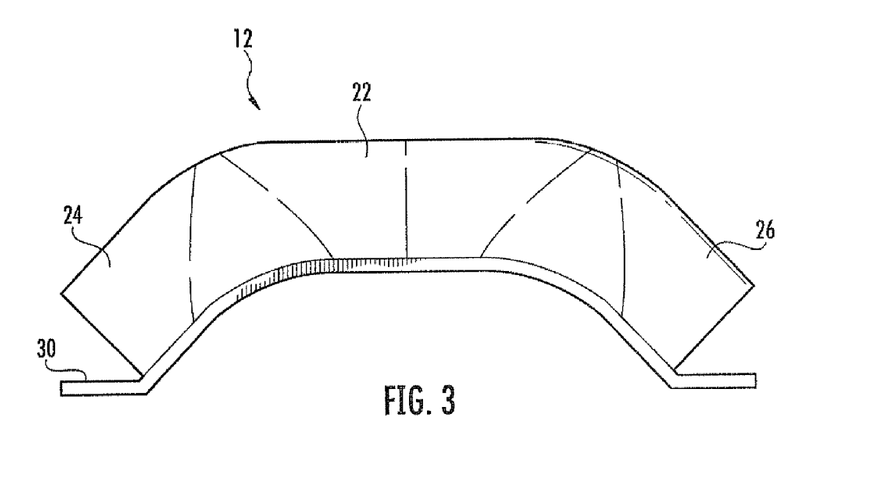
FIG. 3 is a side view of the parabolic trough collector illustrated in FIG. 2.
Figure 4:
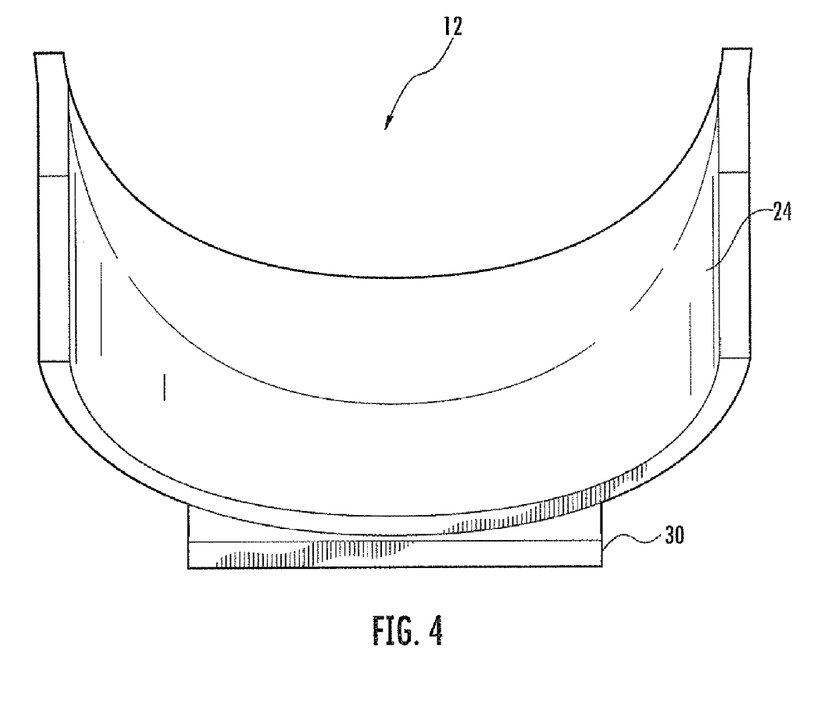
FIG. 4 is an end view of the parabolic trough collector illustrated in FIG. 2.

Referring initially to FIG. 1, a stationary parabolic solar power system 10 comprises a plurality of spaced apart side-by-side parabolic trough collectors 12, and a conduit 14 associated therewith. Each parabolic trough collector 12 is shaped so that a section thereof is always pointed toward the sun. An advantage of the stationary parabolic solar power system 10 is that the parabolic trough collectors 12 do not need to be rotated as the sun travels from east to west during the day since a section thereof is always pointed toward the sun.

Referring now to FIGS. 2-6, each parabolic trough collector 12 includes a center section 22 and a pair of angled end sections 24, 26. One of the angled end sections 24 is pointed toward the sun in the morning as the sun rises, whereas the other end section 26 is pointed toward the sun in the afternoon as the sun sets. Each end section 24, 26 may be angled within a range of 25 to 65 degrees with respect to the ground. The illustrated end sections 24, 26 are shown at 45 degrees with a curved transition to the center section 22. The center section 22 is flat so that it is pointed toward the sun when the sun is more directly overhead.

The center section 22 and the pair of angled end sections 24, 26 are coupled to a base 30. The base may also be referred to as a cradle. The base 30 is bolted to the ground and holds the parabolic trough collector 12 in place. Since there are no moving parts, each parabolic trough collector 12 may be formed as one piece with its base 30. This advantageously increases manufacturing efficiency.

Each parabolic trough collector 12 may be formed out of a molding material comprising a thermoplastic material or a thermosetting material, as readily appreciated by those skilled in the art. The molding material may be based on a polymer or elastomer. The polymers may also be fiber-reinforced.

In forming each parabolic trough collector 12, a STF Sheetless ThermoForming™ process may be used to deliver a dynamically controlled layer of material directly to a mold as it is extruded. This process is a fast and cost-effective way to mold large thermoformed products with a one-step operation directly from an extruder.

Since each parabolic trough collector 12 is stationary, and may be formed as one piece with the base 30, this significantly reduces setup, shipping and maintenance costs typically associated with a parabolic trough solar collector panel that is rotated to track the sun.

Figure 6:
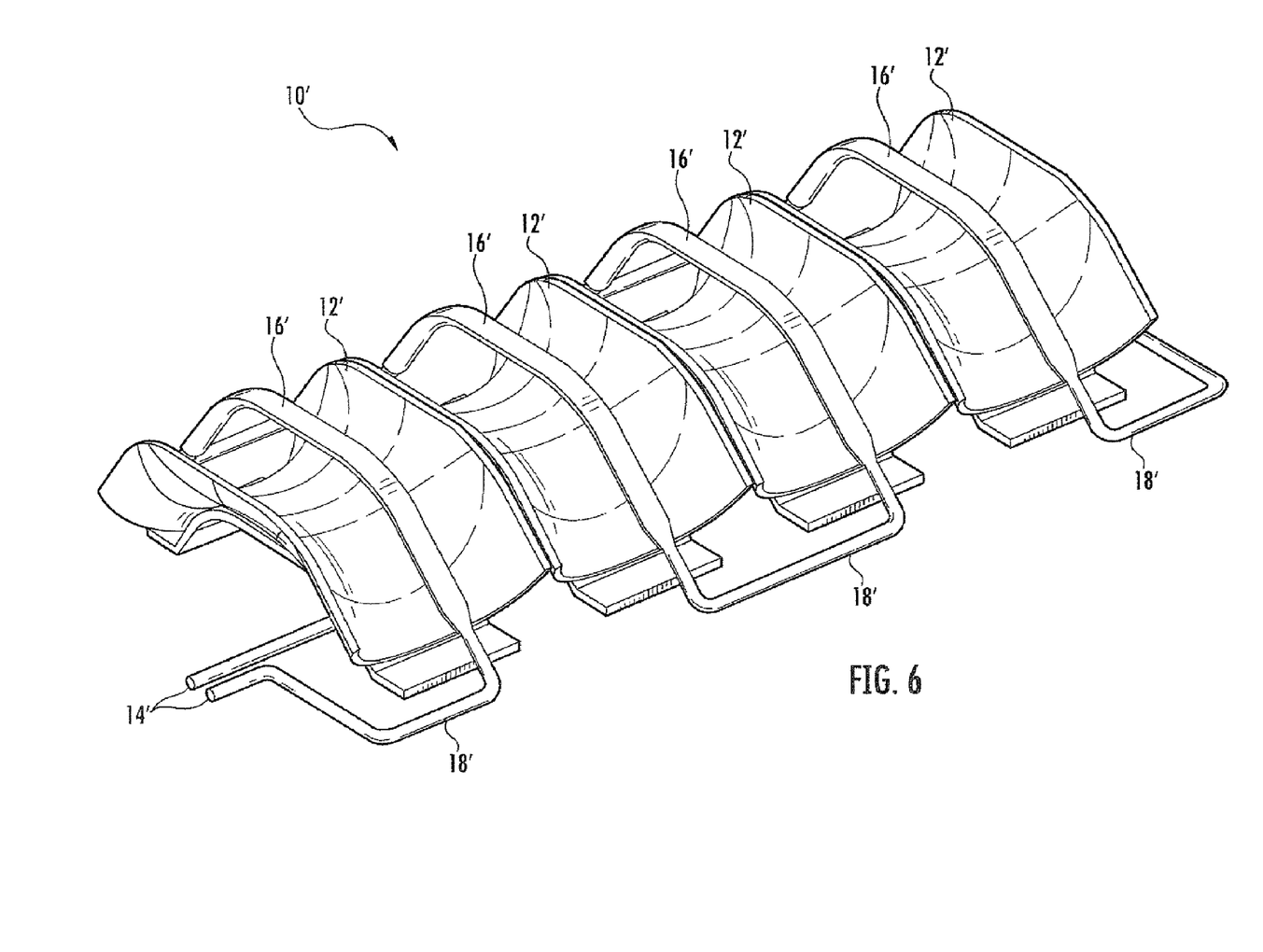
FIG. 6 is a perspective view of another embodiment of the stationary parabolic solar power system illustrated in FIG. 1.

The dimensions of a parabolic trough collector 12 may be 8 feet wide, 15 feet long, and 8 feet tall. Of course, the parabolic trough collector 12 may be formed in other dimension depending on the intended application. Even though the illustrated parabolic trough collectors 12 are spaced apart in FIG. 1, they may be positioned so that there is no space between, as illustrated in FIG. 6. Moreover, the sides of the parabolic trough collectors 12 may be configured so that they have interlocking sides. In lieu of interlocking sides, clips or clamps may be used to couple together an adjacent pair of parabolic trough collectors 12.

Each parabolic trough collector 12 has a reflective surface for reflecting sunlight to a longitudinal focal line. A reflective film or coating is on the reflective surface. The coating may be a reflective paint, for example. The use of mirrors is avoided, which would significantly add to the weight of the parabolic trough collector 12.

Figure 5:
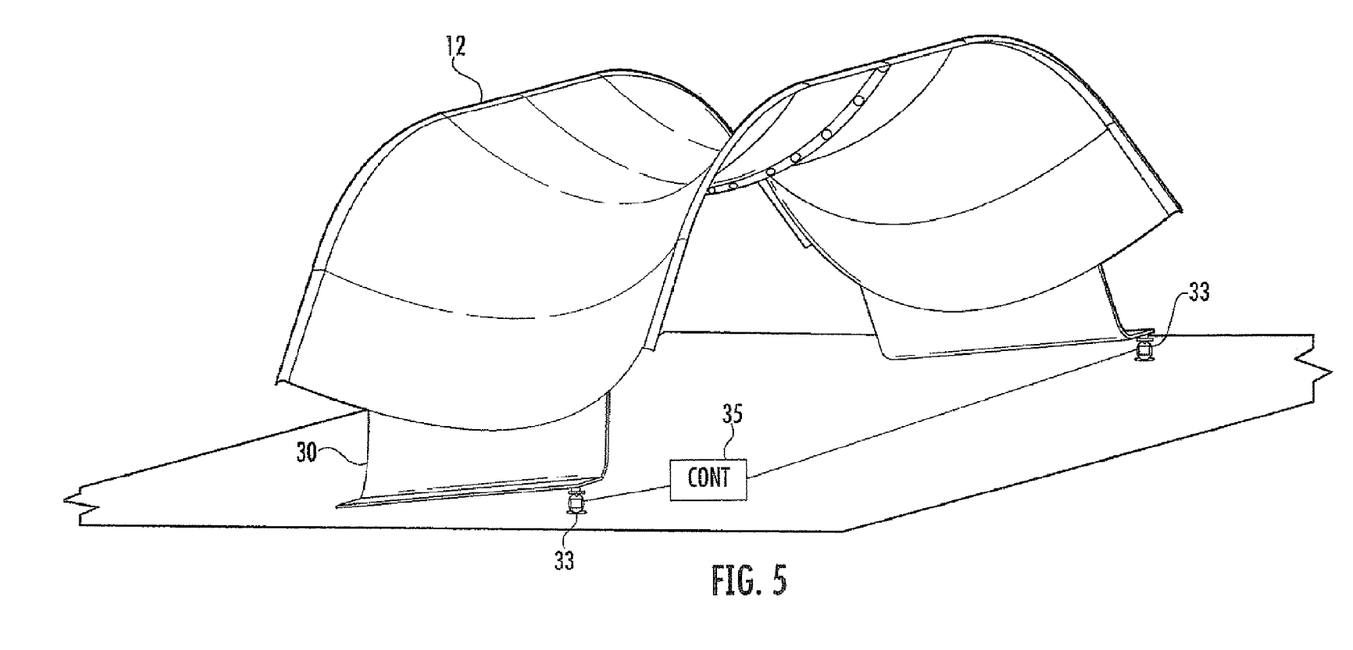
FIG. 5 is a perspective side view of a single parabolic trough collector with a tilting device associated therewith to compensate for the seasonal rotation of the sun in accordance with the present invention.

Tilting devices 33 may be carried by each base 30 to adjust a latitudinal angle of the parabolic trough collector 12 with respect to the ground. As illustrated, one side of the base 30 is tilted to increase the surface area of the parabolic trough collector 12 as the sun moves during its seasonal rotation. In other words, the parabolic trough collector 12 is rotated in a north-south direction.

The tilting devices 33 may be jackscrews, for example. Rotation of the parabolic trough collector 12 throughout the year may be within plus/minus 10 degrees, for example. Although the illustrated base 30 has a pair of tilting devices 33 associated therewith, the actual number will vary depending on the configuration of the base.

A controller 35 is connected to the tilting devices 33 for control thereof so that each base 30 is incrementally adjusted to provide the desired rotation, as readily appreciated by those skilled in the art. One controller 35 may control the tilting devices 33 for a plurality of bases 30 making up the stationary parabolic solar power system 10.

The conduit 14 will now be discussed in greater detail. Although the conduit 14 is discussed with respect to the parabolic trough collectors 12, the conduit 14 can be applied other types of solar energy collector systems, as readily appreciated by those skilled in the art. In other words, the illustrated conduit 14 associated with parabolic trough collectors 12 is for illustration purposes, and this is not to be viewed as limiting.

The conduit 14 comprises spaced apart parallel sections 16 positioned along the longitudinal focal line of a parabolic trough collector 12. Interconnecting sections 18 are coupled to the parallel sections 16. A heat transfer liquid (i.e., a fluid) is circulated through the conduit 14, where it will be heated by the sun's energy.

Figure 7:
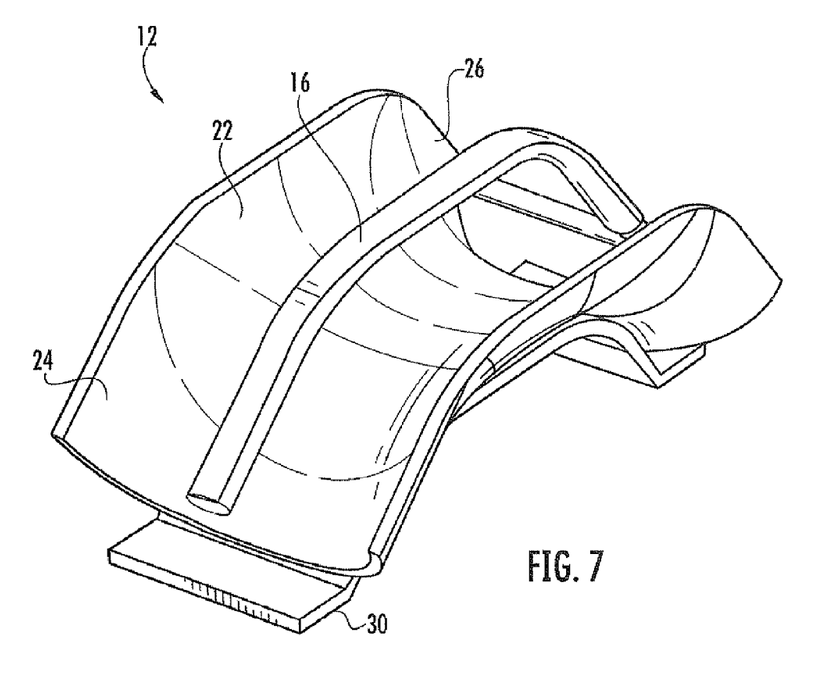
FIG. 7 is a partial perspective side view of the parabolic trough collector and a conduit positioned thereabove in accordance with the present invention.
Figure 8:
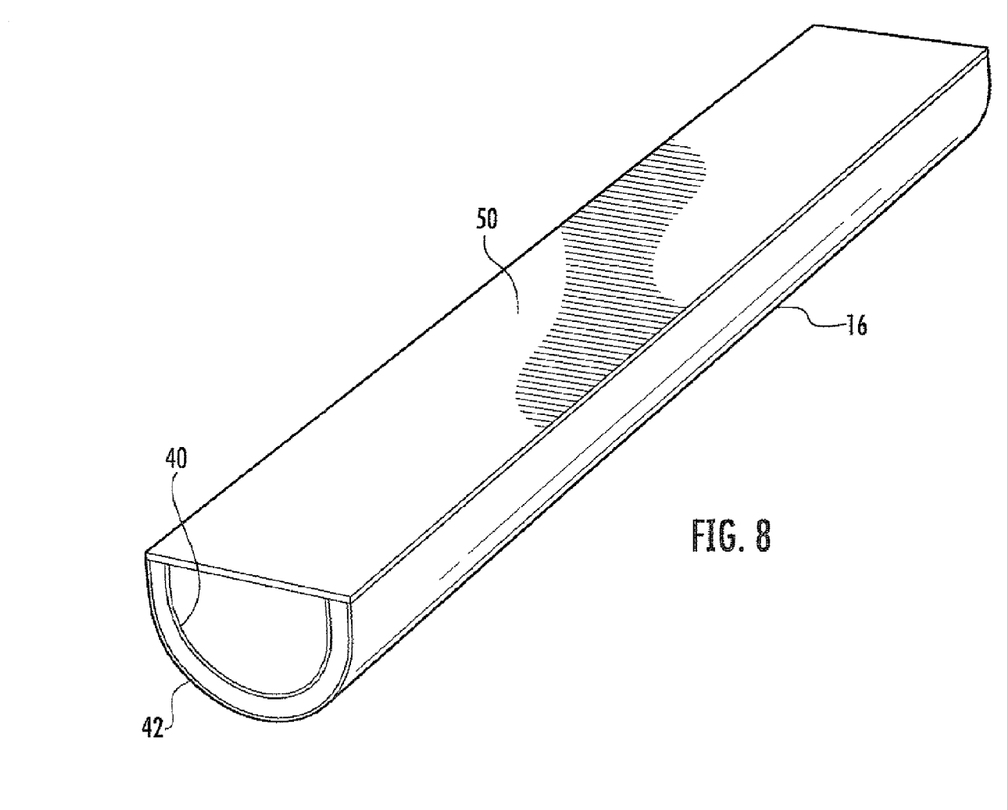
FIG. 8 is a partial perspective side view of the conduit illustrated in FIG. 7.

As best illustrated by the partial perspective views in FIGS. 7 and 8, the parallel sections 16 of the conduit 14 comprise an inner tube or pipe 40 and an outer tube or pipe 42, wherein the heat transfer liquid is circulated between the inner and outer tubes. By limiting the heat transfer liquid to within the inner and outer tubes 40 and 42, the volume of fluid to be heated is reduced. However, the outer tube 42 provides a larger focal point for collecting the sunlight.

As readily appreciated by those skilled in the art, the volume of a tube is equal to $\pi r^2$ times the length L of the tube. A larger diameter tube has a larger focal point, which makes it easier to collect the solar energy for heating the heat transfer liquid. However, this requires a larger volume of heat transfer liquid to be heated which in turn reduces efficiency of the solar power system 10.

A smaller diameter tube has a smaller focal point, which means that a smaller volume of heat transfer liquid is to be heated. However, a smaller diameter tube typically requires periodic adjustments so that the tube is properly aligned with respect to the longitudinal focal lines of the parabolic trough collectors 12 for collecting the solar energy.

By circulating the heat transfer liquid between the inner and outer tube 42 and 44, a larger focal point is advantageously obtained with a reduced volume of heat transfer liquid. Both the inner and outer tube 42 and 44 may have an opaque coating.

Another distinctive feature of the parallel sections 16 of the conduit 14 is that it has a U-shape or half-circle shape. In other words, the uppermost or top half of each parallel section 16 has been removed. This advantageously reduces the volume of the heat transfer liquid to be heated. A conduit cover 50 is attached to the exposed inner and outer tube 42 and 44 to seal off the heat transfer liquid as well as the inner surfaces of the inner tube 40. The conduit cover 50 may be clear in order to create a green house effect by letting sunlight in but trapping the heat from escaping.

The interconnecting sections 18 coupled to the parallel sections 16 do not need the inner/outer tube configuration as in the parallel sections. Instead, the interconnecting sections 18 comprise a single tube or pipe for circulating the heat transfer liquid to or from the parallel sections 16. The interconnecting sections 18 may also be insulated.

Figure 9:
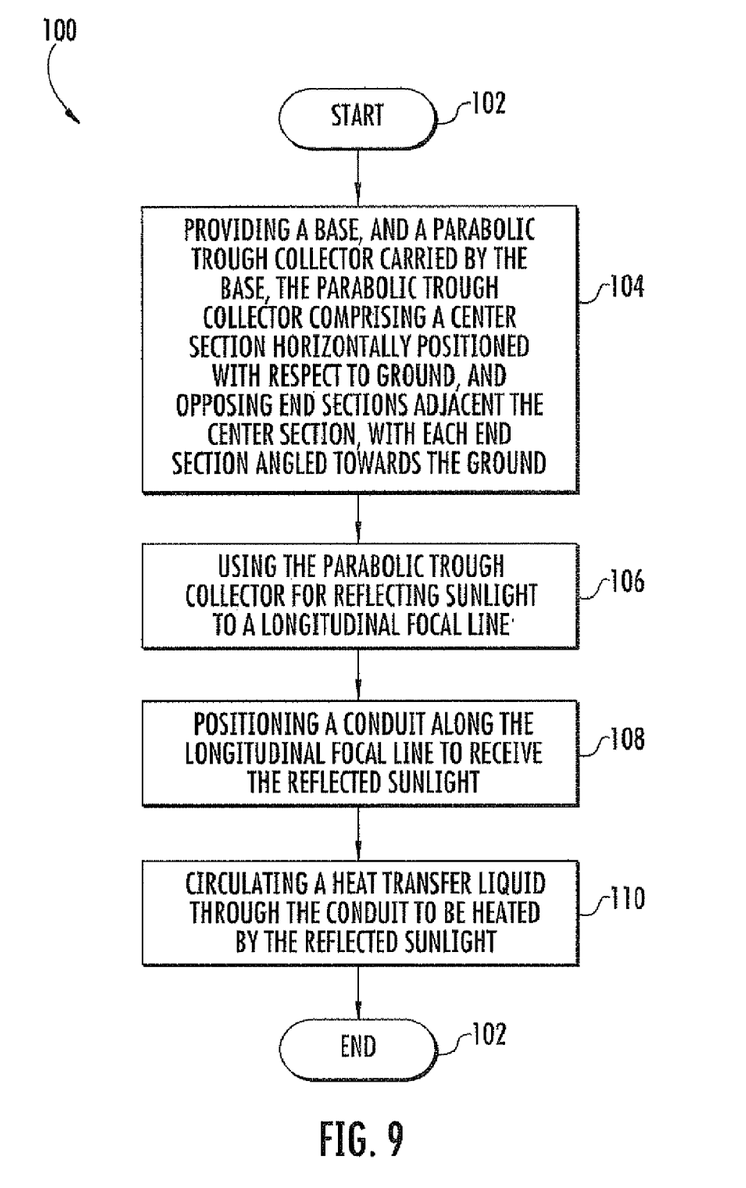
FIG. 9 is a flowchart illustrating a method for collecting solar energy using a solar energy collector system in accordance with the present invention.

Another aspect is directed to a method for collecting solar energy using a solar energy collector system 10 as described above. Referring now to the flowchart 100 illustrated in FIG. 9, from the start (Block 102), the method comprises providing at least one base 30, and at least one parabolic trough collector 12 carried by the at least one base at Block 104. The at least one parabolic trough collector 12 comprises a center section 22 horizontally positioned with respect to ground, and opposing end sections 24, 26 adjacent the center section, with each end section angled towards the ground. The method further comprises at Block 106 using the at least one parabolic trough collector 12 for reflecting sunlight to a longitudinal focal line. A conduit 16 is positioned along the longitudinal focal line to receive the reflected sunlight at Block 108. A heat transfer liquid is circulated through the conduit 16 to be heated by the reflected sunlight at Block 110. The method ends at Block 112.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A solar energy collector system comprising:
    at least one base; and
    at least one parabolic trough collector carried by said at least one base for reflecting sunlight to a longitudinal focal line spaced away from said at least one parabolic trough collector, said at least one parabolic trough collector comprising
        a center section extending horizontally with respect to said at least one base, and
        opposing end sections coupled to said center section, with each end section extending at an angle downward from said center section and with a curved transition therebetween.

2. The solar energy collector system according to claim 1 wherein said at least one parabolic trough collector and said at least one base remain stationary when reflecting sunlight to the longitudinal focal line as the sun travels east to west during the day.

3. The solar energy collector system according to claim 1 further comprising at least one tilting device coupled to said at least one base for adjusting a latitudinal angle of said at least one parabolic trough collector with respect to the ground.

4. The solar energy collector system according to claim 1 further comprising a conduit positioned along the longitudinal focal line to receive the reflected sunlight, said conduit to circulate a heat transfer liquid therethrough to be heated by the reflected sunlight.

5. The solar energy collector system according to claim 4 wherein said conduit comprises a center section horizontally positioned with respect to the ground, and opposing end sections adjacent said center section, with each end section angled towards the ground.

6. The solar energy collector system according to claim 4 wherein said conduit comprises an outer tube surrounding an inner tube, with the heat transfer liquid to be circulated in a space defined between said inner and outer tubes and without the heat transfer liquid circulating within the inner tube.

7. The solar energy collector system according to claim 6 wherein each of said inner and outer tubes is U-shaped.

8. The solar energy collector system according to claim 7 wherein said conduit further comprises a conduit cover covering exposed upper portions of said U-shaped inner and outer tubes to seal off the heat transfer liquid.

9. The solar energy collector system according to claim 8 wherein said conduit cover also covers said inner tube between the exposed portions of said U-shaped inner tube.

10. The solar energy collector system according to claim 8 wherein said conduit cover comprises a clear material; and wherein said inner and outer tubes each comprise an opaque coating.

11. The solar energy collector system according to claim 1 wherein said at least one parabolic trough collector and said at least one base are formed as a monolithic unit.

12. The solar energy collector system according to claim 11 wherein said at least one parabolic trough collector and said at least one base each comprises at least one of a thermoplastic material and a thermosetting material.

13. The solar energy collector system according to claim 1 wherein an angle between each end section of said at least one parabolic trough collector and the ground is within a range of about 25 to 65 degrees.

14. The solar energy collector system according to claim 13 wherein the angle between each end section and the ground is about 45 degrees.

15. The solar energy collector system according to claim 2 wherein said at least one base comprises a plurality of bases adjacent one another; wherein said at least one parabolic trough collector comprises a plurality of parabolic trough collectors adjacent one another; wherein each base is carrying a respective parabolic trough collector having a conduit positioned along the longitudinal focal line; and wherein said conduit further comprises a respective interconnecting section for connecting adjacent conduits together.

16. The solar energy collector system according to claim 15 wherein the adjacent parabolic trough collectors are coupled together.

17. A solar energy collector system comprising:
at least one base;
at least one collector carried by said at least one base for reflecting sunlight to a longitudinal focal line spaced away from said at least one collector; and
a conduit positioned along the longitudinal focal line to receive the reflected sunlight, said conduit comprising an inner tube, and
an outer tube surrounding said inner tube, with a heat transfer liquid to be circulated in a space defined between said inner and outer tubes and without the heat transfer liquid circulating within the inner tube, with an uppermost half of each of said inner and outer tubes being U-shaped.

18. The solar energy collector system according to claim 17 wherein said conduit further comprises a conduit cover covering exposed upper portions of said U-shaped inner and outer tubes to seal off the heat transfer liquid.

19. The solar energy collector system according to claim 18 wherein said conduit cover also covers said inner tube between the exposed portions of said U-shaped inner tube.

20. The solar energy collector system according to claim 17 wherein said conduit cover comprises a clear material; and wherein said inner and outer tubes each comprises an opaque coating.

21. A method for collecting solar energy using a solar energy collector system, the method comprising:
providing at least one base, and at least one parabolic trough collector carried by the at least one base, the at least one parabolic trough collector comprising a center section extending horizontally with respect to the at least one base, and opposing end sections coupled to the center section, with each end section extending at an angle downward from the center section and with a curved transition therebetween; and
using the at least one parabolic trough collector for reflecting sunlight to a longitudinal focal line spaced away from the at least one parabolic trough collector.

22. The method according to claim 21 wherein the at least one parabolic trough collector and the at least one base remain stationary when reflecting sunlight to the longitudinal focal line as the sun travels east to west during the day.

23. The method according to claim 21 further comprising adjusting a latitudinal angle of the at least one parabolic trough collector with respect to the ground using at least one tilting device coupled to the at least one base.

24. The method according to claim 21 further comprising positioning a conduit along the longitudinal focal line to receive the reflected sunlight, the conduit for circulating a heat transfer liquid therethrough to be heated by the reflected sunlight.

25. The method according to claim 24 wherein the conduit comprises a center section horizontally positioned with respect to the ground, and opposing end sections adjacent the center section, with each end section angled towards the ground.

26. The method according to claim 24 wherein the conduit comprises an outer tube surrounding an inner tube, with the heat transfer liquid circulating in a space defined between the inner and outer tubes and without the heat transfer liquid circulating within the inner tube.

27. The method according to claim 24 wherein each of the inner and outer tubes is U-shaped.

28. The method according to claim 27 wherein the conduit further comprises a conduit cover covering exposed upper portions of the U-shaped inner and outer tubes to seal off the heat transfer liquid.

29. The method according to claim 28 wherein the conduit cover also covers the inner tube between the exposed portions of the U-shaped inner tube.

30. The method according to claim 29 wherein the conduit cover comprises a clear material; and wherein the inner and outer tubes each comprises an opaque coating.

31. The method according to claim 21 wherein the at least one parabolic trough collector and the at least one base are formed as a monolithic unit.

32. The method according to claim 21 wherein an angle between each end section of the at least one parabolic trough collector and the ground is within a range of about 25 to 65 degrees.

33. The method according to claim 21 wherein the at least one base comprises a plurality of bases adjacent one another; wherein the at least one parabolic trough collector comprises a plurality of parabolic trough collectors adjacent one another; wherein each base is carrying a respective parabolic trough collector having a conduit positioned along the longitudinal focal line; and further comprising using a respective interconnecting section for connecting adjacent conduits together.

34. The method according to claim 33 further comprising coupling the adjacent parabolic trough collectors together.

* * * * *